United States Patent [19]

Ostrander

[11] Patent Number: 4,616,348
[45] Date of Patent: Oct. 7, 1986

[54] METHOD OF ATTENUATING SEA ICE FLEXURE NOISE DURING SEISMIC SURVEYS OF PERMAFROST REGIONS

[75] Inventor: William J. Ostrander, Benicia, Calif.

[73] Assignee: Chevron Research Company, San Francisco, Calif.

[21] Appl. No.: 547,703

[22] Filed: Oct. 31, 1983

[51] Int. Cl.$^4$ ............................ G01V 1/20; G01V 1/38
[52] U.S. Cl. ......................................... 367/21; 367/15; 367/37; 367/56
[58] Field of Search .................. 367/14, 15, 21, 22, 367/36, 37, 56, 62

[56] References Cited

U.S. PATENT DOCUMENTS

| | | | |
|---|---|---|---|
| 3,923,121 | 12/1975 | Kruppenbach | 181/112 |
| 3,934,220 | 1/1976 | Davis | 367/61 |
| 4,363,113 | 12/1982 | Taner et al. | 367/61 |
| 4,461,178 | 7/1984 | Chamurl | 367/75 |

OTHER PUBLICATIONS

4th Ann. Nat. Canadian Soc. of Exp. (Geophys Conv.) Oil Week, vol. 27, SM 15, pp.11-13, 5/24/76.
Yu, "A Rayleigh Wave Dispersion Technique for Geoexploration", 4/75, pp. 4951-4953, Diss. Abst. Int., Sec. B, v 35, No. 10.

Primary Examiner—Nelson Moskowitz
Attorney, Agent, or Firm—H. D. Messner; Edward J. Keeling

[57] ABSTRACT

The present invention indicates that in exploration of permafrost regions of the world for oil and gas accumulations, flexure noise can be attenuated by careful placement of the vibratory source vis-a-vis the receiver array during collection of the Vibroseis ®-type data. It has been surprisingly found that if the explorationist adopts a survey strategy in which the vibratory source is separated from the receiver array by a pressure ridge or its equivalent over the ice formation of the region under survey, then the seismic reflection signals can be easily collected and displayed. Result: continuity of events from onshore reflectors can be easily followed offshore through the transition zone into deeper sea ice regions.

10 Claims, 25 Drawing Figures

STACKED DATA VS. TIME

CROSS CORRELATED STACKED DATA VS. TIME

METHOD OF ATTENUATING SEA ICE FLEXURE NOISE DURING SEISMIC SURVEYS OF PERMAFROST REGIONS

RELATED APPLICATION

Application Ser. No. 547,701 filed simultaneously herewith for "METHOD OF ATTENUATING SEA ICE FLEXURE NOISE DURING SEISMIC SURVEY OF PERMAFROST REGIONS INVOLVING A PRECURSOR AERIAL AND/OR SATELLITE MAPPING STEP", W. J. Ostrander.

SCOPE OF THE INVENTION

This invention relates to seismic exploration during winter in permafrost regions of the world (see Robert F. Black, "Permafrost—A Review" Bulletin of G.S.A. 65, 839 (1954) which locates such regions in Alaska, Canada, Iceland, Greenland, Spitsbergen, Siberia, and the Antarctic), and more particularly to a method of improving seismic signal resolution of seismic records from such areas, by attenuating flexural wave noise, arising from using vibrators as the energy source especially in exploration of transition zones occurring between the shore of a frozen land mass and the adjacent, particularly frozen body of water called sea ice zones.

BACKGROUND OF THE INVENTION

Among the problems of seismic exploration during the winter season in the permafrost zones of the world, is that of efficient collection of seismic data in the short time available for such operations. While dynamite and airguns have previously been used as the seismic energy sources in such environments, since about 1980 vibratory sources have been increasingly used to speed operations, i.e., speed collection of the data at receiver arrays spaced over the frozen surface using convention "roll-along" collection techniques. Result: overlapping coverage of the subsurface can be quickly and efficiently provided in most circumstances.

However, recently when exploration activities were redirected from the frozen land mass to the adjacent frozen sea, say from onshore Alaska into the adjacent frozen Beaufort Sea, high noise patterns appeared on the seismic records. Such noise patterns were largely coherent and interfered with desired reflected seismic energy of interest to a substantial degree. Result: seismic reflection data was essentially unusable in many survey situations, especially in shallow transition zones between conventional land and marine collection areas. That is, reflection events on seismic records associated with the transition zone between the frozen permafrost land mass and sea ice of depths of about 20 to 60 feet, were for the most part, undetectable.

While the effect of such noise was widely commented on by geophysicists, the nature of the phenomena, its physical properties as related to the collection of seismic data in the above-identified zones and moreover, how such noise could be attenuated, as far as I am aware, have not been reported on.

SUMMARY OF THE INVENTION

In accordance with the present invention, high noise patterns in the sea ice-land transition zone of permafrost regions of the world, result from percussive effects, and are not akin to the phenomenon associated with water bottom multiples.

Flexural vibration in a floating ice sheet have been extensively investigated from a theoretical standpoint, see for example, "Elastic Waves in Layered Media", W. M. Ewing et al, McGraw-Hill, 1957 at pages 293 et seq.

Essentially, flexural vibrations in a floating ice sheet are surface waves akin to gravity waves on water, to Rayleigh waves on the surface of elastic solids or to flexural waves in thin plates or membranes. Unfortunately, flexural waves are excited most efficiently by a vibrator source on the ice, and displacements of the flexural wave dominates the other surface-wave modes excited during conventional seismic collection using a vibrator source. While displacements of the Rayleigh-type modes penetrated deep into the solid half-space and decay slowly with depth, the flexural waves confined essentially to the ice layer, seem not to decay exponentially with water depth. That is to say, such waves still appear to have a substantial impact on reflection seismic signals at deeper marine depths.

It has been discovered that such waves arise in the same manner as striking a membrane of a drum with a stick produces an amplified "beat" in the hollow space between the drum heads and the supporting sidewall.

Since the amount of energy "heard" by a listener is a function of distance from that sound (drum) source, location of the vibratory source vis-a-vis the receiver array is, of course, of importance. But in order to attenuate the generated flexure waves, I have found that topography of the survey area plays an even more important role, i.e., is of more vital consideration than the relative spacing between the vibratory source and the receiver array. I have found to my surprise that if a pressure ridge or equivalent sea ice fracture zone is positioned between the vibratory source and the receiver array, the generated flexure waves are surprisingly decoupled prior to their receipt at the array. Result: the desired seismic reflection signals previously hidden by such noise, are displayed as high resolution amplitude-versus-time events.

If a fracture zone is always positioned between the associated sourcepoints of the vibratory sources and the receiver locations, then propagation of flexure noise in the direction toward the receiver array is surprisingly disrupted. It is believed that the vibrations become decoupled in the same manner that small splits in a drum membrane stress-relieve the membrane, and attenuate vibrations across the drum in a lateral direction.

In accordance with the invention, since such fracture zones are plentiful in the transition and sea ice zones, the seismic crew need only to take advantage of such naturally occurring fracturing in the ice interface along the line of survey as collection occurs. Although in such case the line of travel of the source/receiver arrays may be discontinuous, in surveys of the transition zone, such restriction is relatively unimportant since regional rather than local features are of interest.

DEFINITIONS

In this regard, definitions of sea ice features are of importance in order to understand mapping operations in accordance with the invention, and the more important ones are listed below.

| Sea ice terminology | |
|---|---|
| Feature | Description |
| Fast ice | Ice which forms and remains attached to the shore. May extend seaward for |

| Sea ice terminology | |
| --- | --- |
| Feature | Description |
| | a few meters to several hundred kilometers from the coast. |
| Floe | Any relatively flat piece of sea ice 20 m or more across. Floes are classified according to size. |
| Concentration | Ratio (in tenths) of sea surface covered by ice to total area of sea surface. |
| Pack ice | General term for any area of sea ice, other than fast ice, regardless of form or occurrence. Pack ice is classified by concentration of the floes. |
| Lead | Any fracture or passageway through sea ice that is navigable by surface vessels. Leads may be open or refrozen. A flaw lead separates fast ice from pack ice. |
| First-year ice | Sea ice of not more than one winter's growth. Thickness ranges from 30 cm to 2 m. |
| Second-year ice | Old ice that has survived only one summer's melt. Because it is thicker and less dense than first year ice, it stands higher out of the water. |
| Multi-year ice | Old ice 3 m or more thick that has survived at least two summers' melt. |
| Pressure ridge | Wall of broken ice forced up by pressure. |
| Brash ice | Accumulations of floating ice made up of fragments not more than 2 m across; the wreckage of other forms of ice. |
| Iceberg | A massive piece of ice extending more than 5 m above sea level that has broken away from a glacier. Icebergs are classified according to shape. |

Source: From World Meteorological Organization Publication No. 259. TP145.

VIBRATORY REFERENCE

Figure 1:
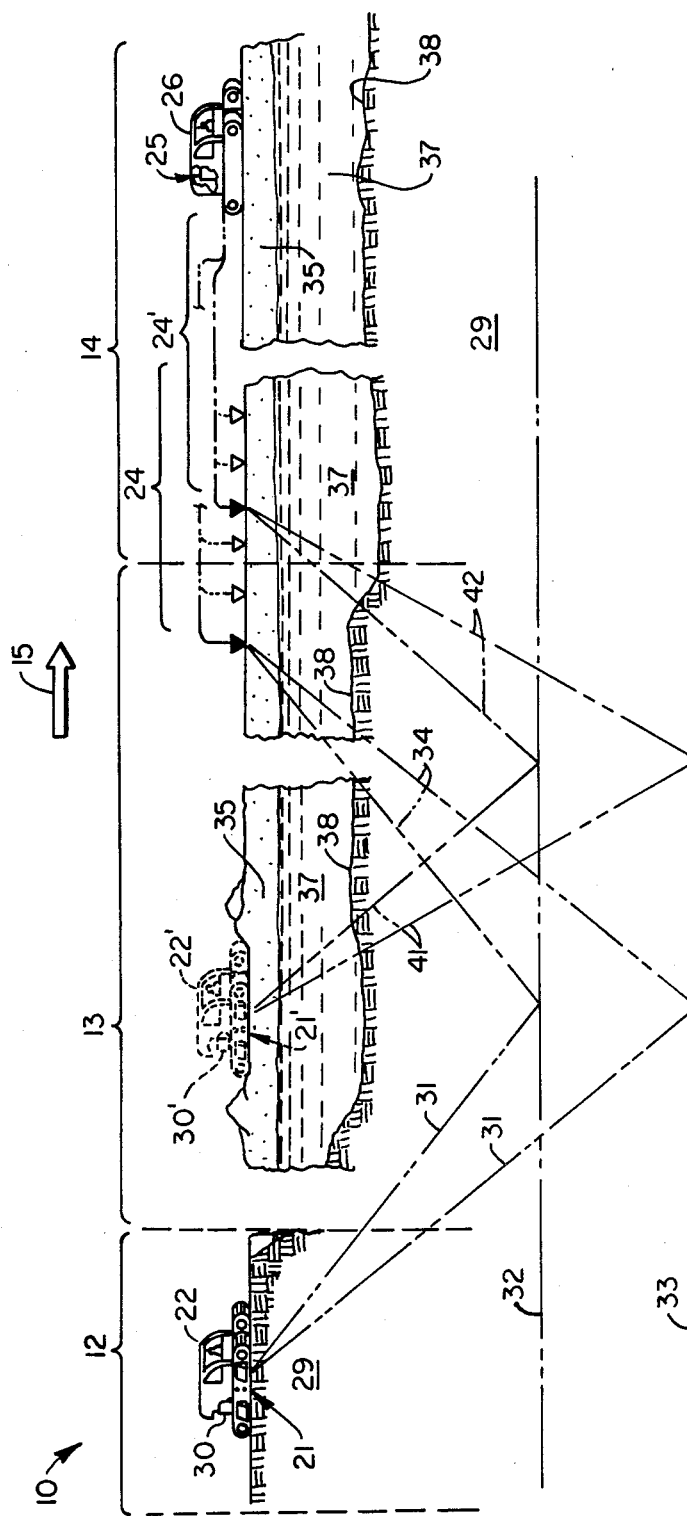
FIG. 1 is section of a permafrost region illustrating operation of the present invention in association with a conventional Vibroseis ® exploration system that includes a vibratory source and an array of seismic receivers located along the ice of the permafrost region.

Doty et al, U.S. Pat. No. 2,688,124, issued Aug. 31, 1954, for "Method and Apparatus for Determining Travel Time of Signals" describes the well-known Vibroseis ® system of Continental Oil Company. In such a system, seismic waves are generated by mechanical vibrators on the earth or sea ice surface. Each of the vibrators is firmly anchored by the combined weight of the source with peak forces in the neighborhood of 10 to 20 tons (and up to 36 tons) being developed by the rapid, non-explosive interaction of the base-plate pad and piston system. The resulting waves sent into the earth consist of long, sinusoidal wave trains of predetermined frequency and time duration characteristics rather than the much sharper wave impulses sent into the earth by the explosive sources used prior to the Vibroseis ® system, or by "weight drop" methods including those provided by various impulse-coded systems, e.g., the so-called "pulse-coded" techniques. That is to say, in the Vibroseis ® system, the amplitude and phase spectra are carefully and continuously controlled so that the resulting energy spectra changes smoothly as a function of time. Thus, a smoothly varying output of desired frequency and duration characteristics is provided in contra-distinction to the binary-coded (ON-OFF) square wave output generated by pulse-coded methods in which the energy-per-blow is substantially constant and cannot be so controlled.

A further essential part of the Vibroseis ® system lies in the processing of the received data to produce records that tend to show shot pulses representing reflections from subsurface interfaces. Such responses are provided by cross-correlating the recorded representation of the vibratory waves sent into the ground with the recorded representation of the waves received subsequently. Since the use of cross-correlations, as taught by Doty et al and many others since, has now become so well known in vibratory seismology, it will be presumed to be well known in the following parts of the present specification. The description will now focus on differences in the permafrost environment to which the present invention pertains.

The method of the present invention also uses conventional common midpoint (CMP) rollalong methods wherein overlapping spreads of receivers in a receiver array receive signals from activated vibratory source(s) as the "redundant" seismic traces are generated. That is, the latter are redundant in that a certain number of traces (a gather of traces) can be associated with the same common midpoint lying midway between a plurality of respective source-receiver pairs that generated the traces in the first place. After application of time shifts to such traces (called static and dynamic corrections), a common midpoint (CMP) gather is created. Thereafter, the associated traces of that gather are stacked, to provide improved signal-to-noise characteristics.

(In regard to the importance of understanding, the relationship between collection coordinates wherein traces are identified by either source-positions (s) and receiver-locations (g) coordinates along the line of survey, or by coordinates associated with source-to-receiver stations offset distance (f), and midpoint location (y) between respective source and receiver pairs, see, in detail, John F. Claerbout's book "Fundamentals of Geophysical Data Processing", McGraw-Hill, 1976 at pages 228 et seq.)

DETAILED DESCRIPTION OF THE INVENTION

Refer now to FIG. 1, illustrating seismic survey system 10 of the present invention is a permafrost environment that comprises land-shoreline region 12, transition zone 13 and sea ice area 14. Path of the survey: in the direction of arrow 15.

System 10 includes a vibratory pad assembly 21 attached to a tracked vehicle 22. The pad 21 is located laterally of and adjacent to a series of detectors 24 electrically connected to recording and processing equipment 25 shown schematically within tracked vehicle 26. Method of seismic collection: the pad 21 and detector array 24 are periodically relocated in the direction of arrow 15 to provide multi-fold, subsurface coverage conventional in the art.

Characteristics of land-shoreline region 12: as vibratory pad 21 injects seismic vibrations in a continuous, non-impulsive manner into earth formation 29 under control of a control signal generated by sweep generator 30 within tracked vehicle 22, resulting vibratory waves represented by ray paths 31, travel obliquely downward toward a pair of stratal interfaces 32, 33 where they undergo partial reflection and travel back upward along paths 34 again obliquely toward the series of detectors 24. In the example of FIG. 1, assume that the series of detectors 24 extend of a portion of transition zone 13 and sea ice area 14, and contact ice formation 35 common to both regions.

Amplitude-versus-time characteristics of the emitted vibrations vary over a predetermined time duration and frequency spectrum, under control of the control signal of the sweep generator 30. The sweep control signal controlling vibratory pad 21 is also fed through a separate formation channel to the processing and recording unit 25 within vehicle 26. In the unit 25, cross-correlations are made of the full-wave received data and the injected vibratory sweeps and the results depicted as amplitude-versus-time records conventional in the art.

Note that since the pad 21 is in solid contact with the earth formation 29, experience has shown that flexure noise is not generated. Hence, seismic signals of interest can be easily detected at the series of detectors 24. That is to say, the resulting cross-correlated record provided by the recording and processing circuit 25 is relatively flexure noise-free even though the detectors 24 are in contact with the ice formation 35 in transition zone 13 and sea ice area 14.

Characteristics of transition zone 13: Assume that the system 10 has proceeded in the direction of arrow 15 whereby the vibratory source pad 21' (and vehicle 22') are positioned as shown in phantom line in FIG. 1 and the series of active detectors 24 have been repositioned a similar incremental distance but remain in active contact with the ice formation 35 common to both transition zone 13 and sea ice area 14. At its new sourcepoint position, the pad 21' is seen to be located above the unfrozen sea 37 and sea bottom 38, a certain depth in a range of about 15 to 60 feet. Similarly, the series of relocated detectors 24' (following roll-up) are all located in the sea ice area 14 above the sea bottom 38 a certain depth (or depths) greater than 60 feet.

In operation, vibratory waves are again injected in a continuous and non-impulsive manner through the ice formation 35 and unfrozen sea water 37, and thence into formation 29, such waves traveling along ray paths 41, downward toward the stratal interfaces 32, 33 previously mentioned, where they undergo partial reflection and travel back along paths 42 to the detectors 24.

The sweep control signal controlling pad 21' is again fed through a separate channel to the processing and recording unit 25 within vehicle 26.

But after subsequent cross-correlation of the vibratory sweep and the detected signals has occurred, experience shows such records are unsatisfactory, being dominated by flexure noise. Such noise has been found to be so intense that reflection signals from the interfaces 32, 33 are impossible to authenticate from such records.

In order to better understand how the present invention attenuates such noise, a brief history of the nature of flexure noise in a permafrost environment is believed to be in order and is presented below.

NATURE OF FLEXURE NOISE VIS-A-VIS VIBRATORY SOURCES

In order to understand the characteristics of flexure noise, an understanding of the properties of such waves is manditory. For ease of analysis the thickness of the ice formation must be small compared to the seismic wavelength of interest. Hence, the ice formation can be treated using plate theory (Ewing et al, 1957 op. cit.). With this assumption the seismic wave field in the water layer and the rock can be described in terms of uncoupled P and SV waves wherein for the relevant dynamic variables, divergence ($\Delta = \nabla \times U$ for the P-wave) and the curl ($W = \nabla \times U$ for the SV-wave) are preferred. In the water layer, no shear wave exists and for the earth formation rock, the radiation condition at infinite depth assumes only exponentially decaying displacements. Hence, by matching the boundary conditions on the ice-water interface as well as water-rock interface, dynamic variables in terms of the source pressure can be expressed.

Essentially, flexural vibrations in a floating ice sheet are surface waves akin to gravity waves on water, to Rayleigh waves on the surface of elastic solids or to flexural waves in thin plates or membranes. Unfortunately, flexural waves are excited most efficiently by a vibrator source on the ice, and displacements of the flexural wave dominates the other surface-wave modes excited during conventional seismic collection using a vibrator source. While displacements of the Rayleigh type modes penetrated deep into the solid half-space and decay slowly with depth, the flexural waves confined essentially to the ice layer, seem not to decay exponentially with water depth. That is to say, such waves appear to have a substantial impact on reflection seismic signals at deeper marine depths.

Figure 2A:
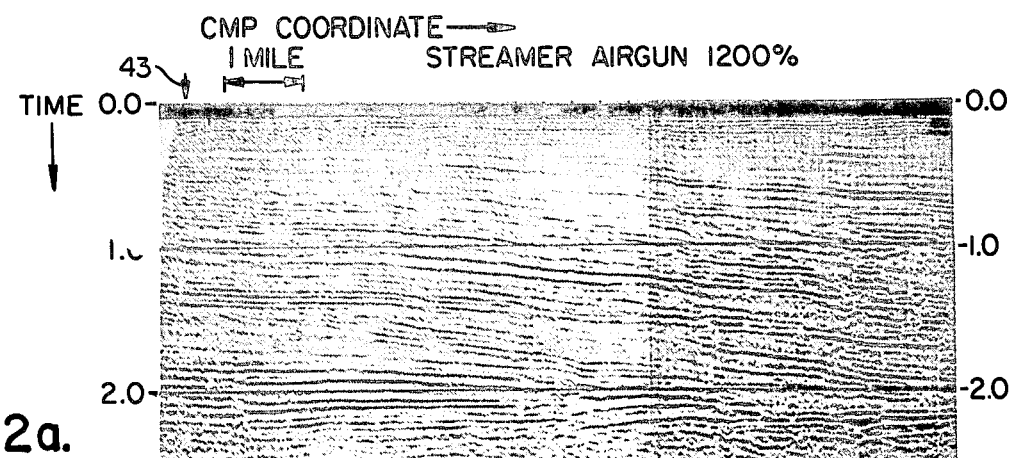
FIGS. 2a, 2b, 2c, 2d, 2e, and 2f are series of conventional records of stacked data versus common midpont coordinate along the line of survey collected over essentially the same geographical area in northern Alaska under two separate climatic conditions and using two different types of energy sources to illustrate the existence of high flexure noises in the data associated with vibratory sources collected in winter but not in the data collected using conventional marine sources in the summer months.
Figure 2B:
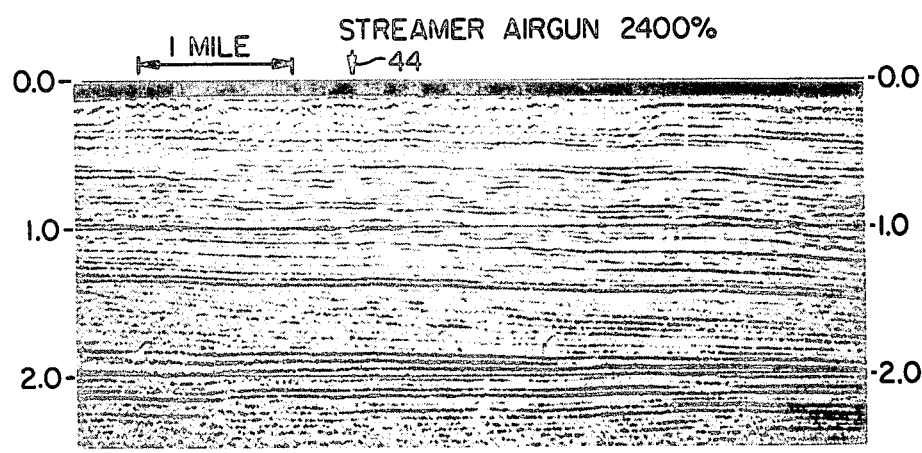
Figure 2C:
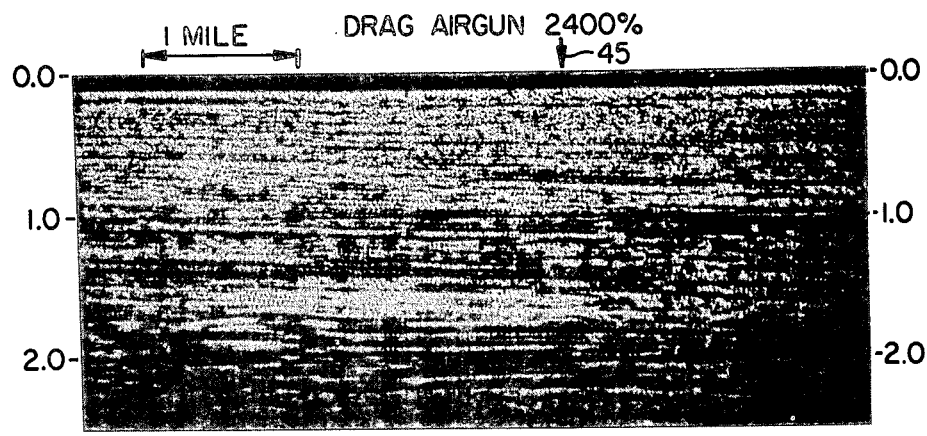
Figure 2D:
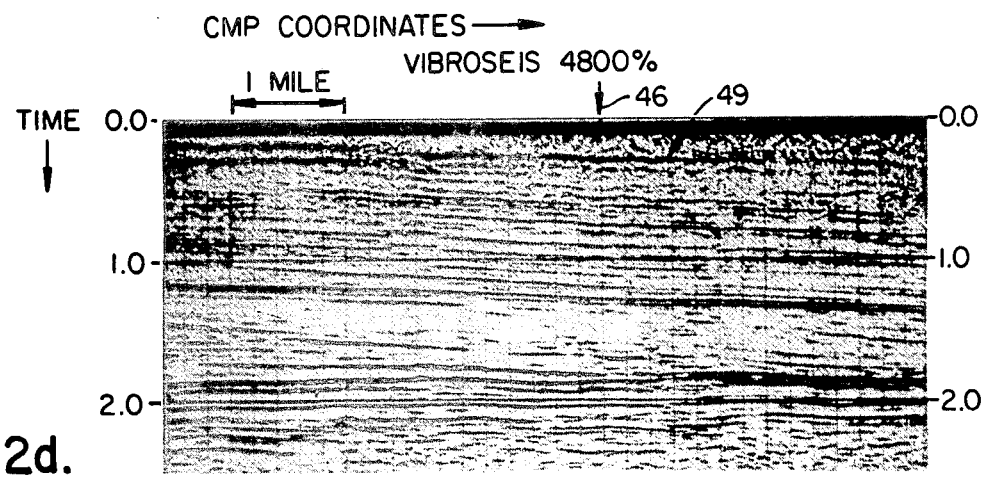
Figure 2E:
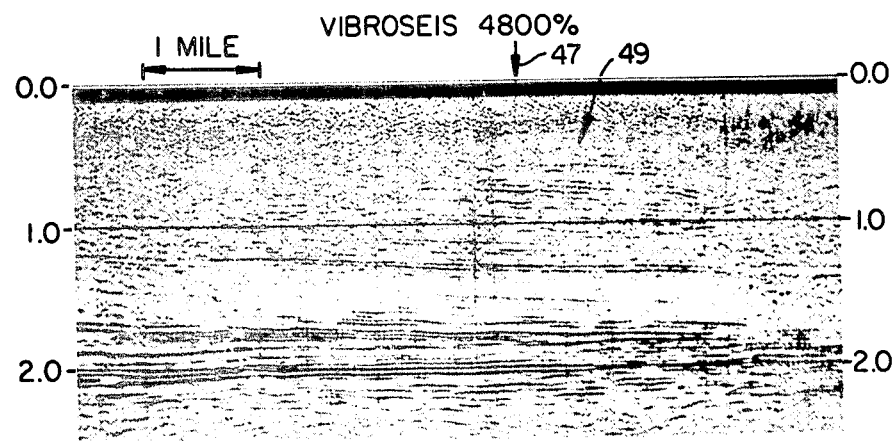
Figure 2F:
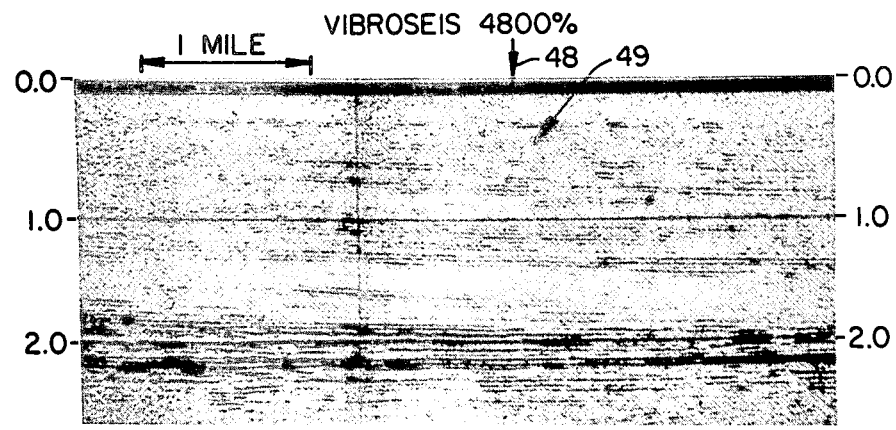

FIGS. 2a-2f illustrate stacked data associated with the same survey line in the Beaufort Sea area in northern Alaska gathered using two separate exploration schemes under two different climatic conditions. That is to say, FIGS. 2a-2c illustrate marine stacked data collected in the summer months using multirepeating air gun-hydrophone array; while FIGS. 2d-2f illustrate Vibroseis ® cross-correlation records collected in winter. In the FIGS., the common zone makers are indicated at numbers 43-48 respectively.

Note that in FIGS. 2d-2f showing the Vibroseis ® data even though stacking has occurred to improve the signal-to-noise ratio, data quality still suffers from high flexure noise at region 49 of the FIGS., respectively.

This is not true of the marine data of FIGS. 2a-2c where there is a pausity of flexure noise. Hence, better resolution of seismic events is evident.

Figure 3A:
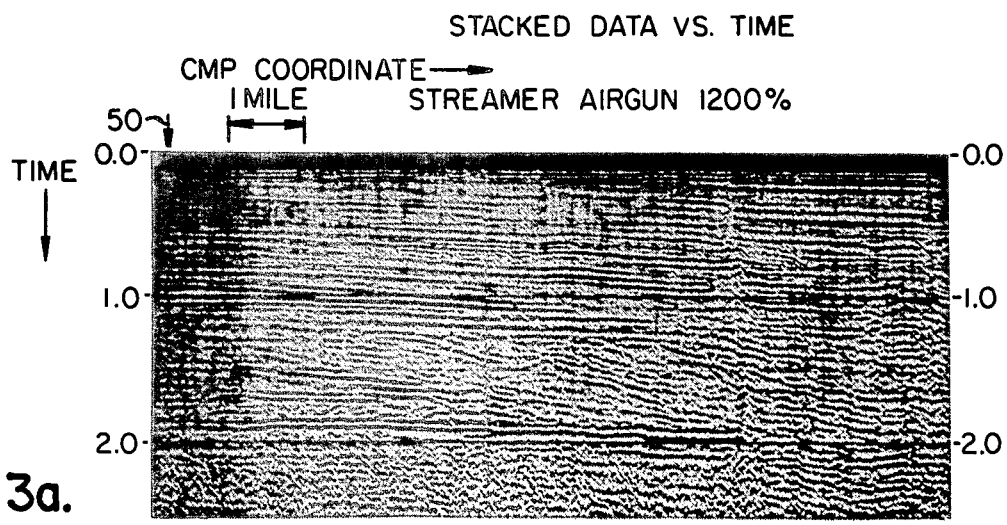
FIGS. 3a, 3b, 3c, 3d, 3e, and 3f are akin to the records of FIGS. 2a-2f but being associated with a different geographical region in northern Alaska, that is, being a series of records of stacked data versus common midpoint coordinate along the line of survey collected over essentially the same region under two separate climate conditions and using two different types of energy sources to illustrate the existence of high flexure noise in the data associated with vibratory sources (collected in winter months) but not in the data collected using conventional marine sources in the summer months.
Figure 3B:
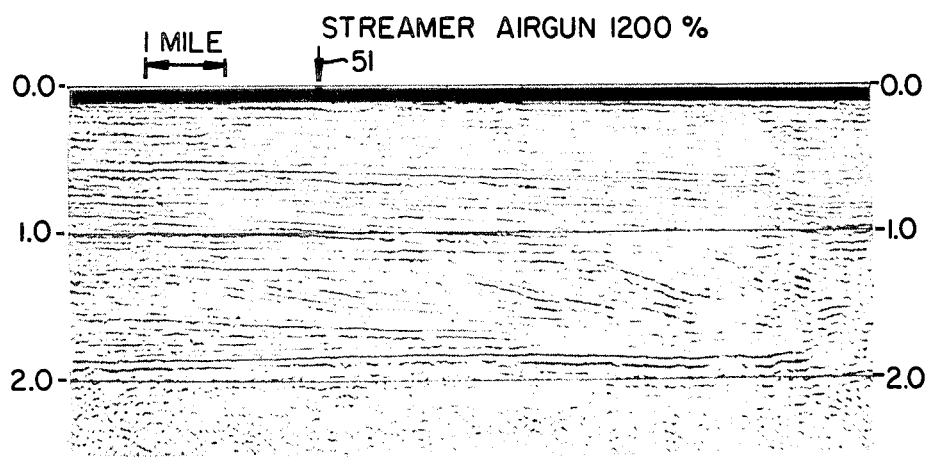
Figure 3C:
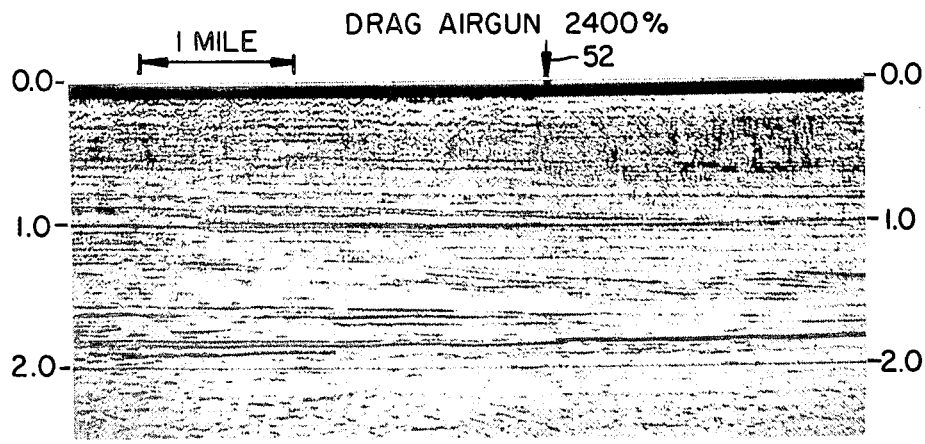
Figure 3D:
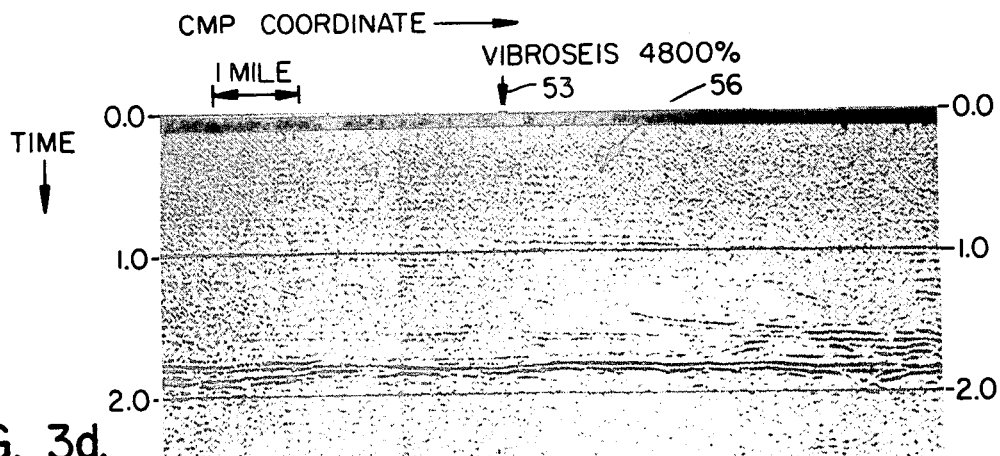
Figure 3E:
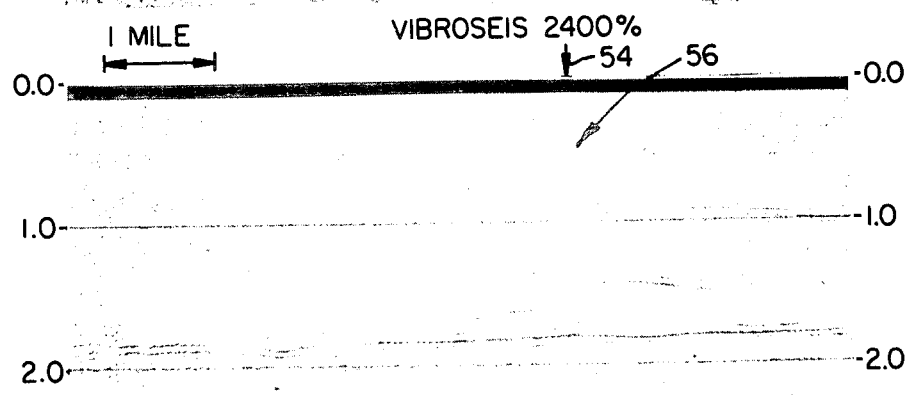
Figure 3F:
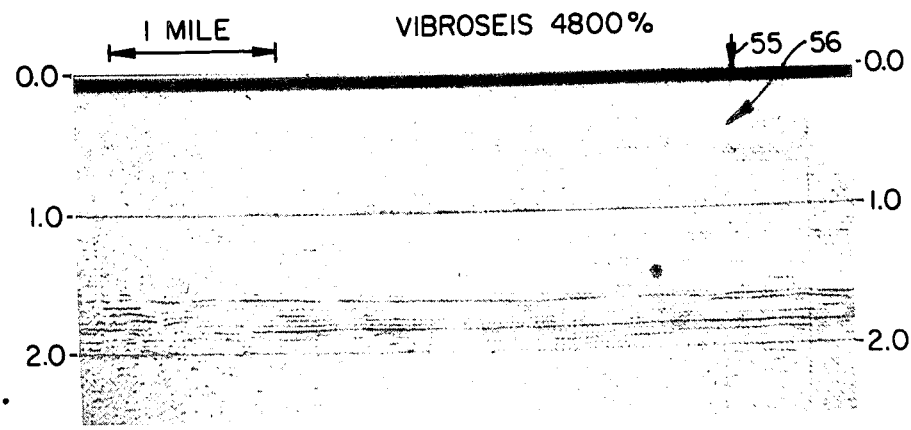

Similarly, FIGS. 3a-3f illustrate stacked data associated with the same Beaufort Sea area in northern Alaska gathered using multi-coverage exploration schemes under different climatic conditions. That is to say, FIGS. 3a-3c illustrate marine stacked data collected in the summer months using multi-repeating air gun-hydrophone array; while FIGS. 3d-3f illustrate Vibroseis ® cross-correlation records collected in winter. In the FIGS., the zone marker common to the records is indicated at numbers 50-55, respectively.

There is a further difference. FIGS. 3d-3f suggest further that if the ice formation extends to the bottom of the bay, i.e., the sea water in the area of survey was completely frozen, then data quality is much improved.

Note that in the Vibroseis ® data of FIGS. 3d-3f, even though stacking has occurred to improve the signal-to-noise ratio, data quality still suffers from high flexure noise at a region 56 of the FIGS., respectively; note also that the marine data of FIGS. 3a-3f is substantially improved thereover.

Owing to the fact that the Vibroseis ® data of FIGS. 2d-2f and 3d-3f were collected during a different climatic season vis-a-vis the marine data of FIGS. 2d-2e and 3d-3e, it is difficult to compare them. A detailed study was therefore undertaken in northern Alaska. Object of the study: to determine now topography and other geographical factors affect data quality.

Figure 4:
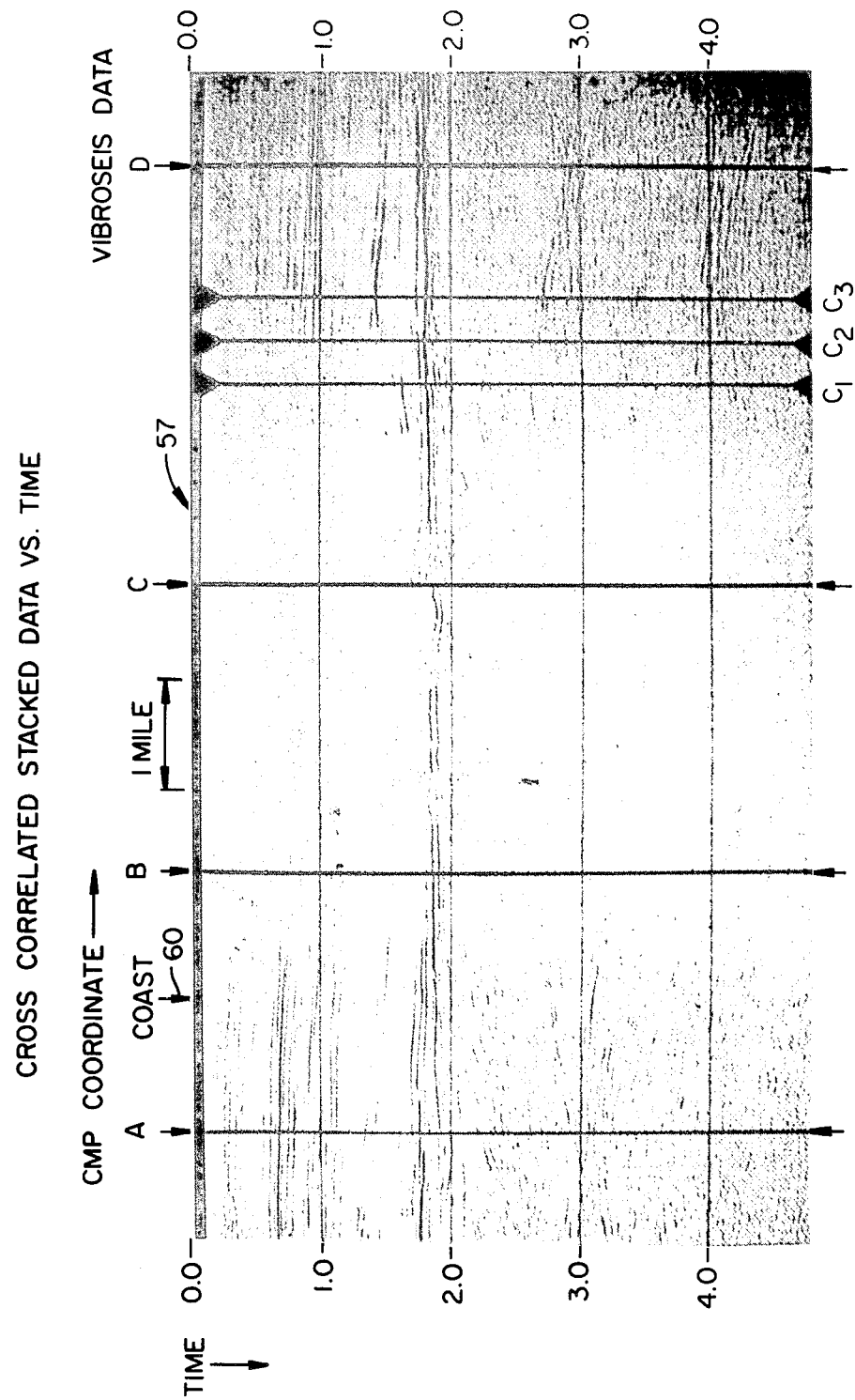
FIG. 4 is a conventional seismic record of cross-correlated stacked Vibroseis ® data versus common midpoint coordinate along a particular line of survey a coastal region in northern Alaska, so as to illustrate the generation and propagation of flexure noise in the transition zone of area under survey as well as in the sea ice region thereof.

The overall local of such study is set forth in FIG. 4 illustrating stacked Vibroseis ® amplitude data-versus-time as a function coordinate position along survey line 57. Land data is indicated by the data associated with a line captioned by the letter "A". The coastline of the surveyed region is indicated by arrow 60; and subsequent seismic data lines to be studied in detail proceed from the coastline 60 outward into the sea ice, and are indicated at "B", "C" and "D". Between lines "C" and "D", there are three lines labeled "$C_1$", "$C_2$" and "$C_3$".

Note in FIG. 4 that the data quality falls off substantially between the coastline 60 and the sea ice regions associated lines "C", "$C_1$", "$C_2$", "$C_3$" and "D". Result: in the record, say between time t=0 to time t=2 seconds, seismic reflections are uninterpretable.

Figure 5:
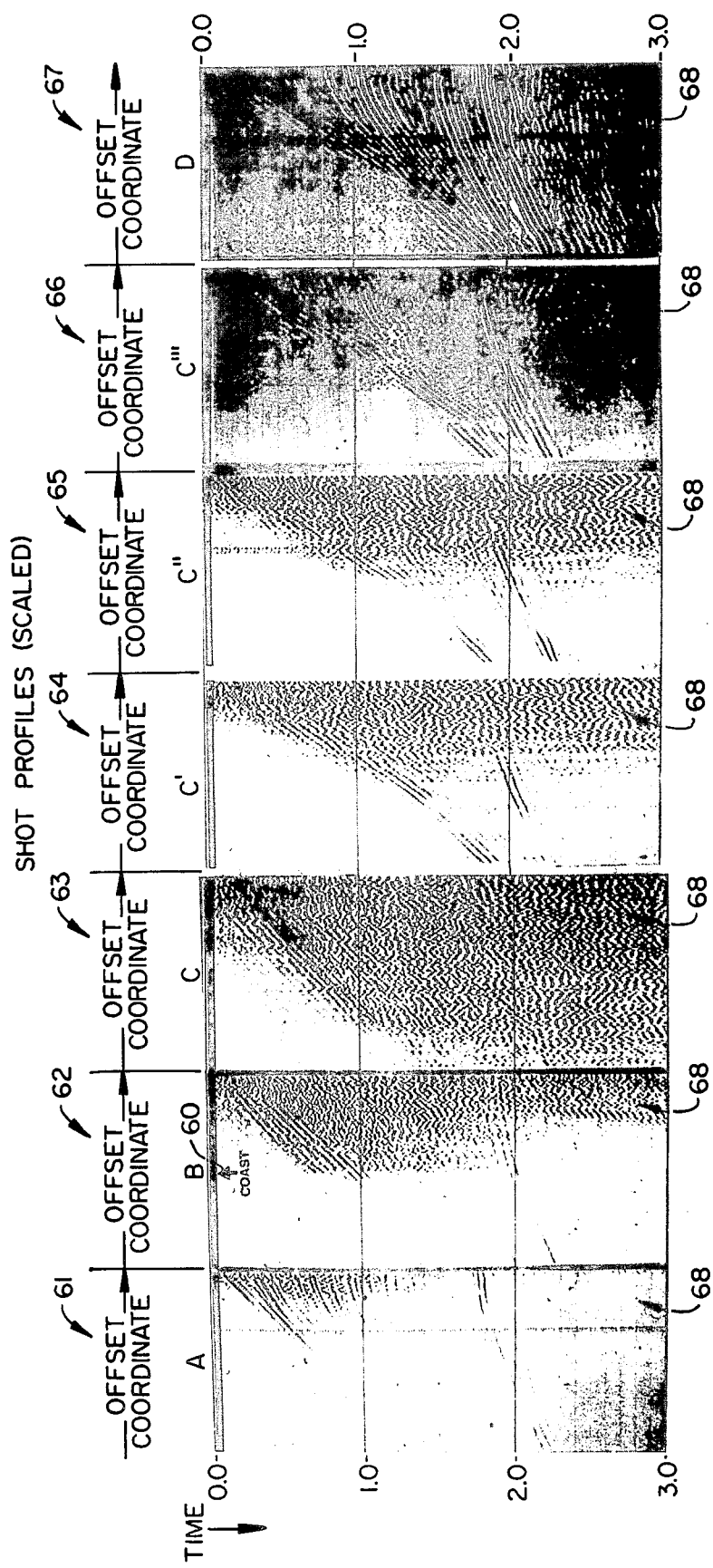
FIGS. 5 and 6 are shot profiles of traces associated with particular shot coordinates along the line of survey of FIG. 4 depicting the regions of high flexure noise in detail.
Figure 6:
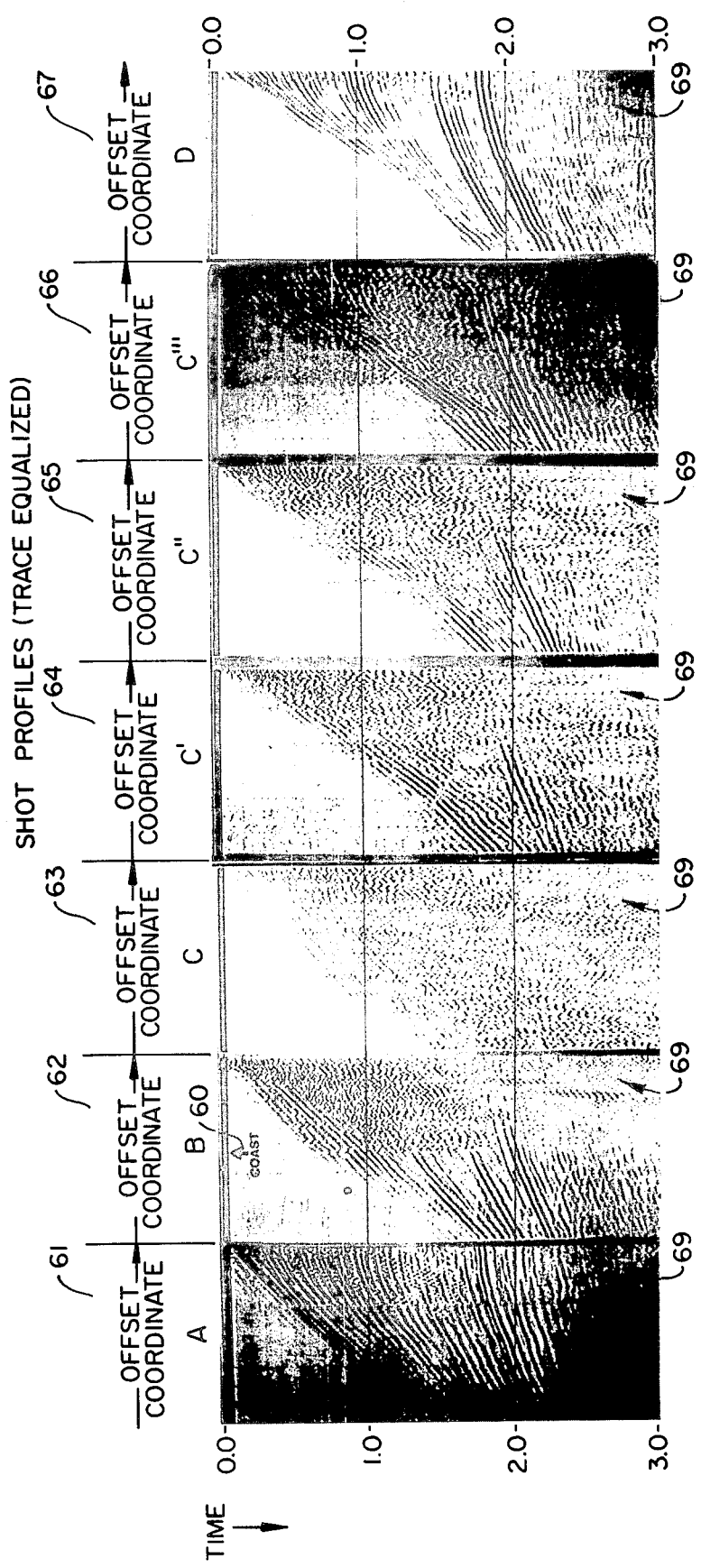

In order to obtain a more clear indication of what caused the poor data quality, the data in the vicinity of lines "A", "B", "C" "$C_1$", "$C_2$", "$C_3$" and "D" were resorted and restored to original form as shown in FIGS. 5 and 6, viz., as a series of correlated shot profiles labeled 61-67, respectively. In FIG. 5, each profile 61,62 . . . was also scaled viz., the amplitudes of the traces were each multiplied by a constant, so that the energy levels associated with the generation of flexure waves could be more clearly shown, especially at the far-offset trace region 68 thereof. The coastline is indicated again at 60.

Likewise in FIG. 6, the overwhelming nature of the flexure noise was again evident, especially in the far-offset region 69 of each profile. The common coastline is again indicated at 60.

Note that in FIG. 6, the traces of each profile 61,62 . . . 67 have been trace equalized, that is, the gain of each channel associated with each trace has been adjusted so that the amplitudes are more easily comparable from trace-to-trace.

While the final presentation of FIG. 6 is seen to provide for reception of seismic reflections via-a-vis the scaled display of the FIG. 5, still the large amount of flexure energy is again seen to be present especially in the far-offset region 69 of each profile, as previously mentioned.

Figure 7:
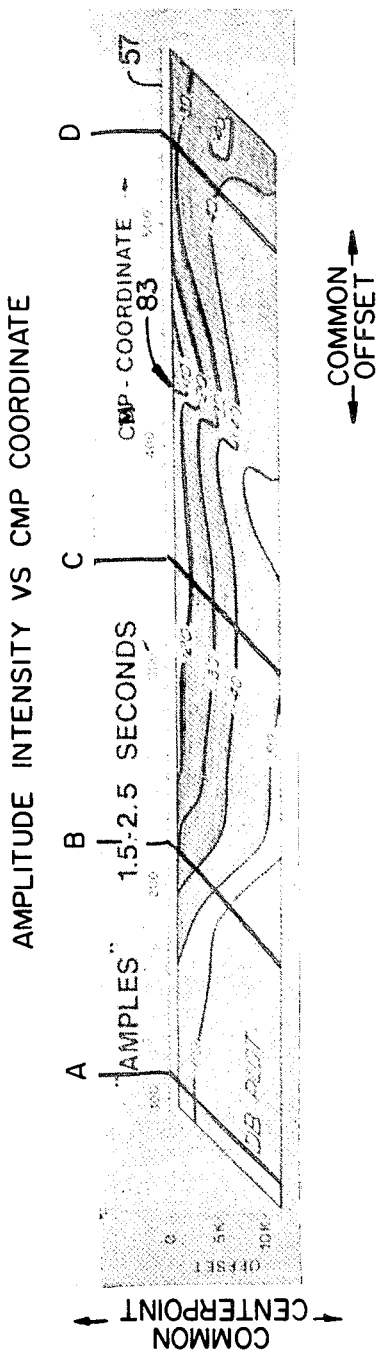
FIGS. 7 and 8 are plots of relative intensity of the collected seismic data of FIG. 4 as a function of common midpoint coordinate along the line of survey of FIG. 4 but normalized to a particular time frame, illustrating the high flexure noise is present in the data associated with both the transition zone of the surveyed area as well as with the sea ice region thereof.
Figure 8:
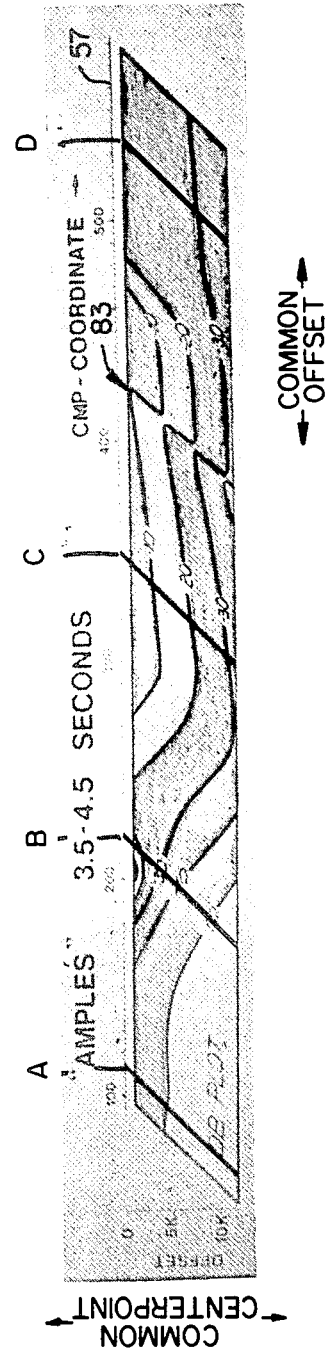

In order to more qualitatively indicate the energy level of the collected Vibroseis ® data shown in FIGS. 5 and 6, it was thought to be important to identify the intensity of the collected data, as a function of common midpoint coordinate (CMP) along the line of survey 57, as shown in FIGS. 7 and 8. In this regard, note that such intensity level has not only been plotted for the profiles of FIGS. 5 and 6 as well as for all intervening profiles, but only for a selected time interval.

That is to say, FIG. 7 is a plot of intensity versus CMP coordinate along the survey line of FIG. 4 for the time increment t=1.5 to t=2.5 seconds. And FIG. 8 is a plot of intensity versus CMP coordinate for the time increment t=3.5 to t=4.5 seconds. Common shot profile lines labeled "A", "B", "C", and "D" in FIGS. 4–6 have also been superimposed upon the intensity plots of FIGS. 7 and 8.

In order to interpret FIGS. 7 and 8, it is important to remember that each contour line is in decibels, wherein trace amplitudes (normalized) has been expressed in terms of 20 log 10 times the traces amplitudes. Thus, a normalized trace amplitude of 2 is equivalent to 6 db; and a normalized amplitude of 4 is equal to 12 db.

(As an aside it should be pointed out that the apparent change in intensity over region 83 was the result of a change in system collection gain and had nothing to do with properties of the reactions under survey.)

So, for a common offset line horizontally imposed across FIGS. 7 and 8, it appears that about a 30-db difference exists from region to region; that is, for the region defined by lines "A" and "B" of the plots vis-a-vis the area bounded by lines "B" and "C", there appears to be more power in the latter than in the former. Result: the interpreter can assume that the significant increase in power has been generated in the collection of data in the transition and sea ice area of the FIGS.; that such increase, more likely than not, is due to the generation of flexure noise by the vibrator source; and moreover, such noise generation appears to be continuous even at deeper marine depths, say the bounded by lines "C" and "D", of FIGS. 7 and 8. Hence, the importance of water depth appears to play an insignificant role in the determination of the amount of flexure noise generation by a vibratory source in the above-identified field survey situation.

Of infinitely more importance, is the topography of the ice formation in the regions of interest. That is, returning to FIG. 6, in profile 67 associated with line "D" in the sea ice region of survey, note that good resolution of the seismic reflection is present in the data, even though from the intensity plots of FIGS. 7 and 8, a significant amount of flexure noise has been generated.

After careful analysis of these data, I believe the reason for such an occurrence is the fact that such region contains numerous pressure ridges. I believe such ridges act as decouplers of the flexure waves generated by the vibratory source in a manner much akin to the effects of splits in a drum head would have to acoustic sounds, that is, the waves would be and are substantially attenuated.

In order to study the above-identified hypothesis in detail, an investigation was undertaken in northern Alaska in the winter season. Object of the study: to determine the affect of pressure ridges and other types of reconsolidated ice fracture zones, on attenuation of flexure waves.

Figure 9:
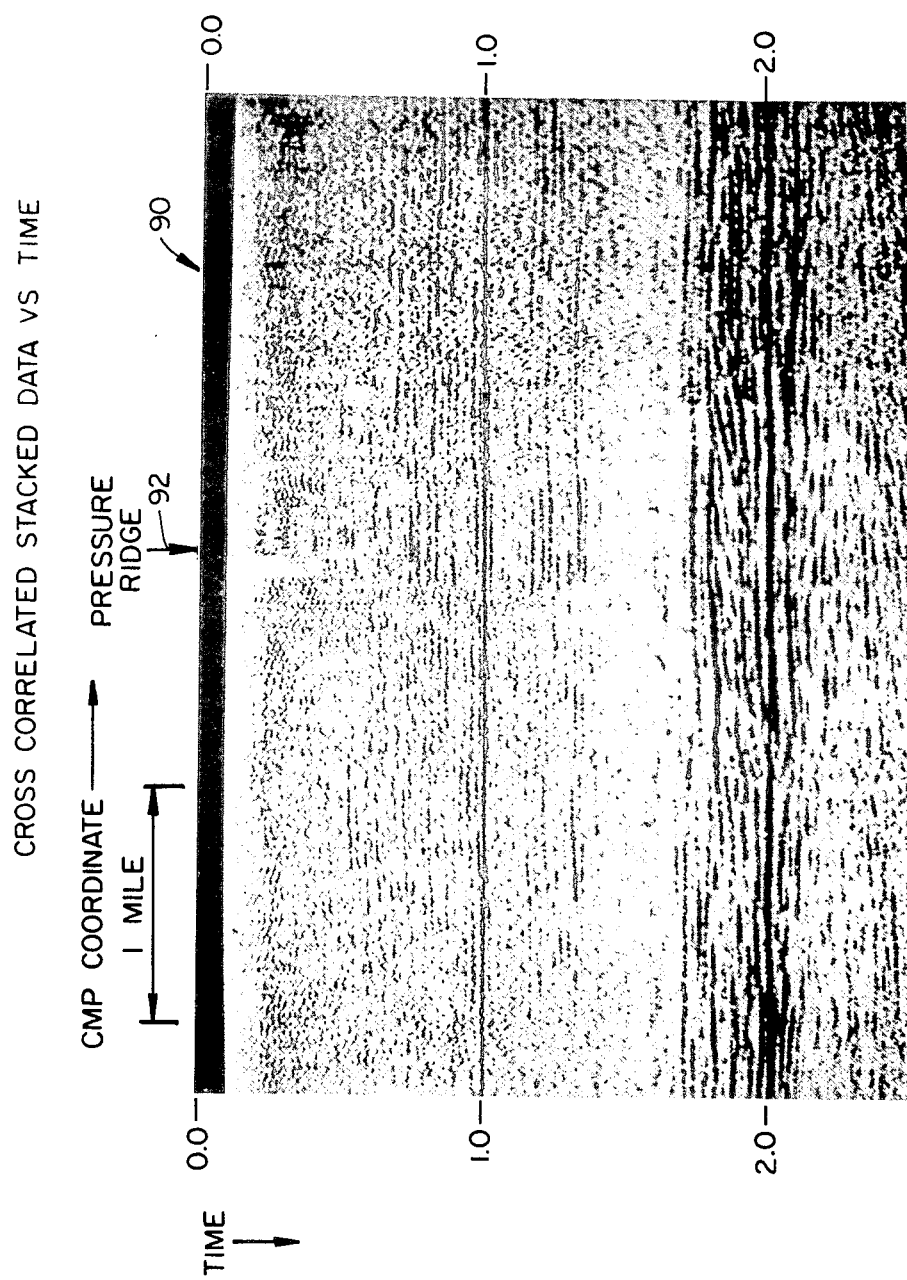
FIG. 9 is another conventional seismic record of cross-correlated stacked Vibroseis ® data versus common midpoint coordinate in the same general region as depicted in FIGS. 4-8 but in which a pressure ridge is present in the ice formation.

The overall local of such study is set forth in FIG. 9, seismic data being collected along a line of survey 90 scaled in miles as shown. Processing of the data is conventional: each trace of each shot profile that depicted in the FIGS. is the product of stacking a series of sub-shot traces, such traces resulting from activating the vibratory a selected number of times (sweeps) at each predetermined shot coordinate along the line of survey 90, typically about 10 sweeps per shot-point. After each shot trace has been formed as described above, the sweep signal of the vibratory source is cross-correlated therewith. Then after the correlated traces have been sorted by common midpoint location along the line of survey 90, stacking of the correlated traces as a function of CMP coordinates, occurs. For typographical reference purposes, a pressure ridge central to the study, is indicated at 92.

Although the improved quality of the stacked data in the vicinity of the ridge 92 of FIG. 9 is not readily apparent from the depicted record, resorting and restoring the data to its original form as shown in FIGS. 11-14, viz., as a series of shot profiles, provides an insight in how decoupling of the flexure wave and resulting improvement in seismic signal quality, occur.

Figure 10:
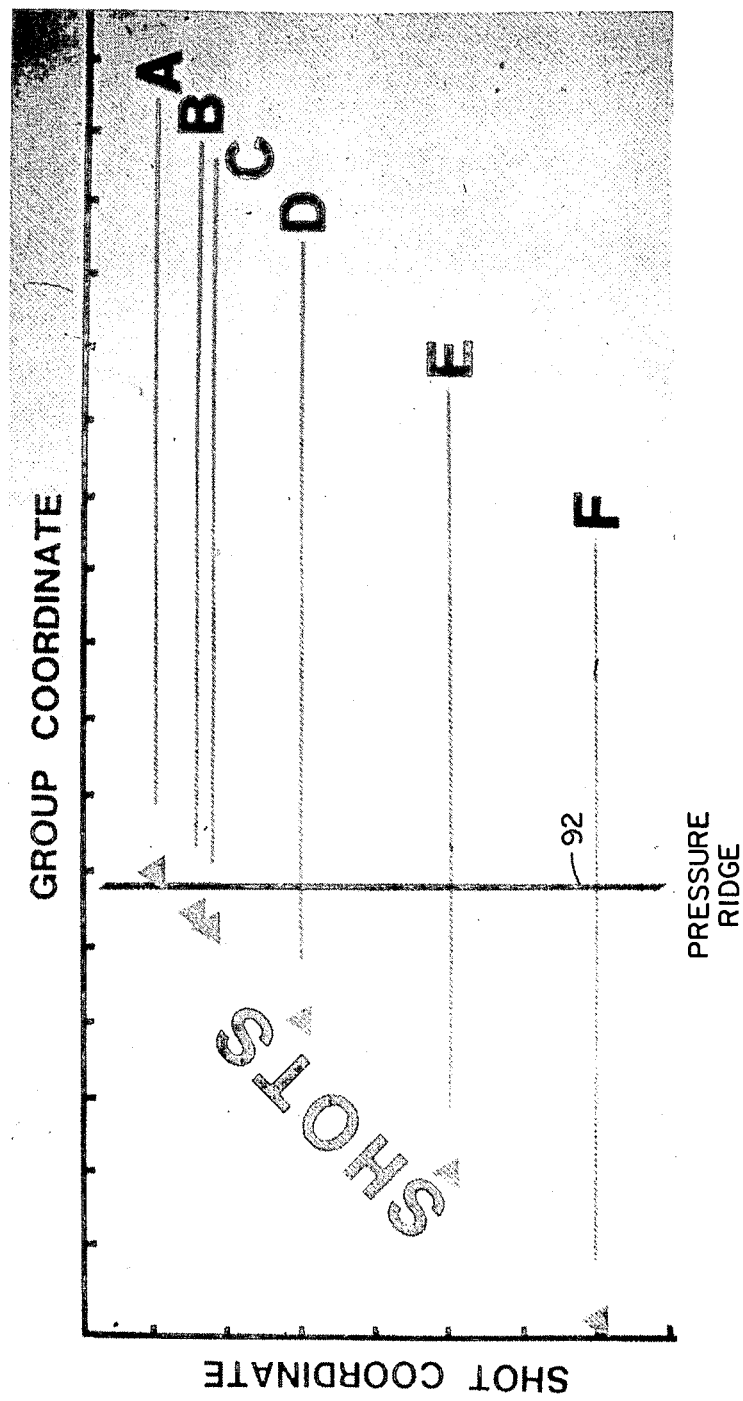
FIG. 10 is a conventional stacking chart illustrating the shot and receiver coordinate positions for providing seismic profiles in the vicinity of the pressure ridge of FIG. 9.

FIG. 10 is a stacking chart indicating how the field data was collected in vicinity of the ridge 92. That is to say, FIG. 10 shows the shot coordinate versus group geophone coordinate as the data was collected along the line of survey 90 of FIG. 9. Particular shot profiles are labeled by the following letter and profile designations: lines "A", "B", "C", "D", "E" and "F" correspond to profiles 93, 94, 95 ... 98, respectively of FIGS. 11-14.

Because of the nature of the study, viz., to indicate the effect of ridge 92 on attenuation of the generated flexure waves, note that the rollalong spacing between shot and array in the vicinity of ridge 92 was not constant. That is to say, referring to FIG. 10, two separate lines were collected where the ridge 92 split the source and geophones, i.e, where the vibratory source was located on one side of ridge 92 and the near offset geophone was located on the other side of the ridge 92. These are labeled as lettered data lines "B" and "C" in FIG. 10 and as profiles 94, 95 in FIGS. 11 and 12. Note in FIGS. 11 and 12 that profiles 94, 95 are also depicted along with lettered line "A" designated as profile 93, for comparison purposes.

Figure 11:
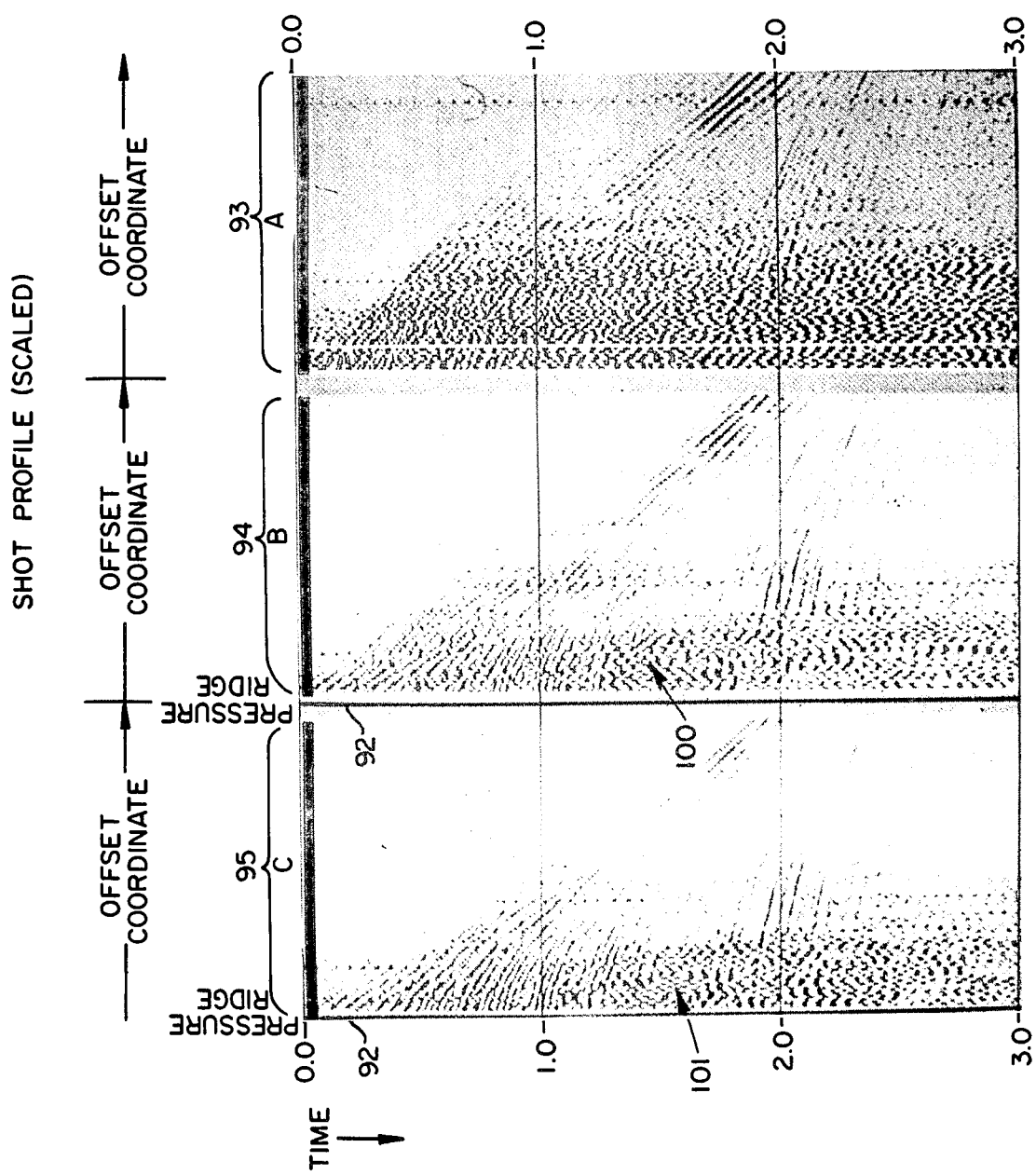
FIGS. 11, 12, 13 and 14 are a series of profiles of traces associated with particular shot positions along the line of survey of FIG. 9 depicting that even in the regions of high flexure noise generation, the presence of the presence ridge along the ice formation of the sea under survey cause decoupling of the propagating flexure waves so that underlying seismic reflection signals are more easily detectable.

In FIG. 11, note that the profiles 93, 94, 95 are scaled representations, (i.e., profiles in which the amplitudes of each were each multiplied by a constant so that the collected energy is more clearly indicated). Note also the profiles 94, 95 associated with lines "B" and "C", respectively have much better event definition, especially in the near regions 100 and 101, as compared to profile 93 corresponding to data line "A". In profiles 94, 95, the location of the ridge 92 is as shown in the FIGS.

Figure 12:
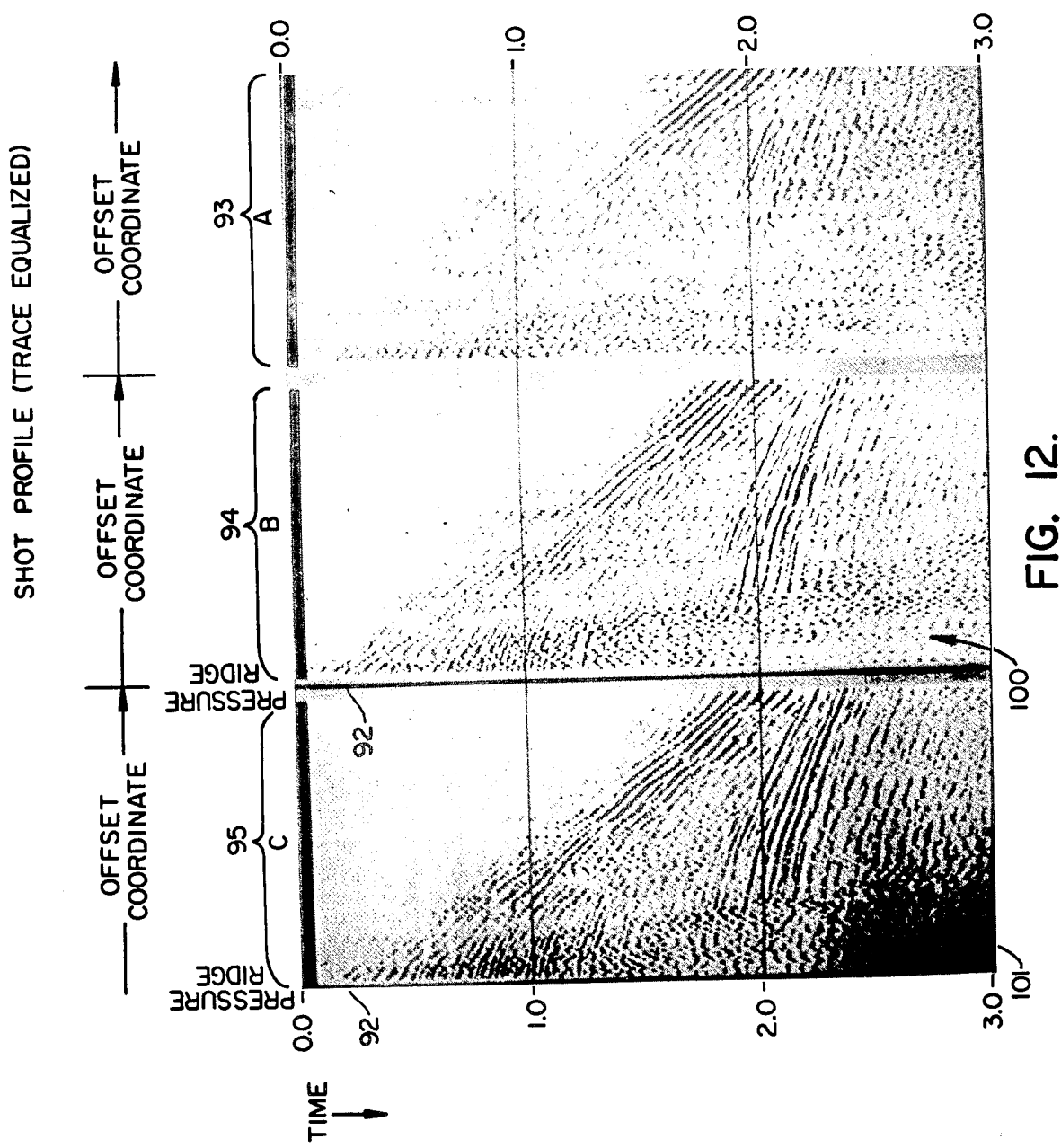

In FIG. 12, the improved resolution of the near regions 100 and 101 (of profiles 94, 95) is even more clearly shown. Note especially the continuity of events around time t=1.0 seconds for these profiles.

CONCLUSION

The physical properties of the ridge 92 that allow attenuation of the flexure waves generated by vibratory sources, is believed to be shared by reconsolidated ice fractures prevalent in the sea ice areas of the permafrost regions of the world. Even though the ridge 92 or equivalent fracture region, need not be deep (the ridge 92 of the FIGS. is believed to be somewhat shallow), it still has a surprising attenuation effect upon the flexure waves.

Figure 13:
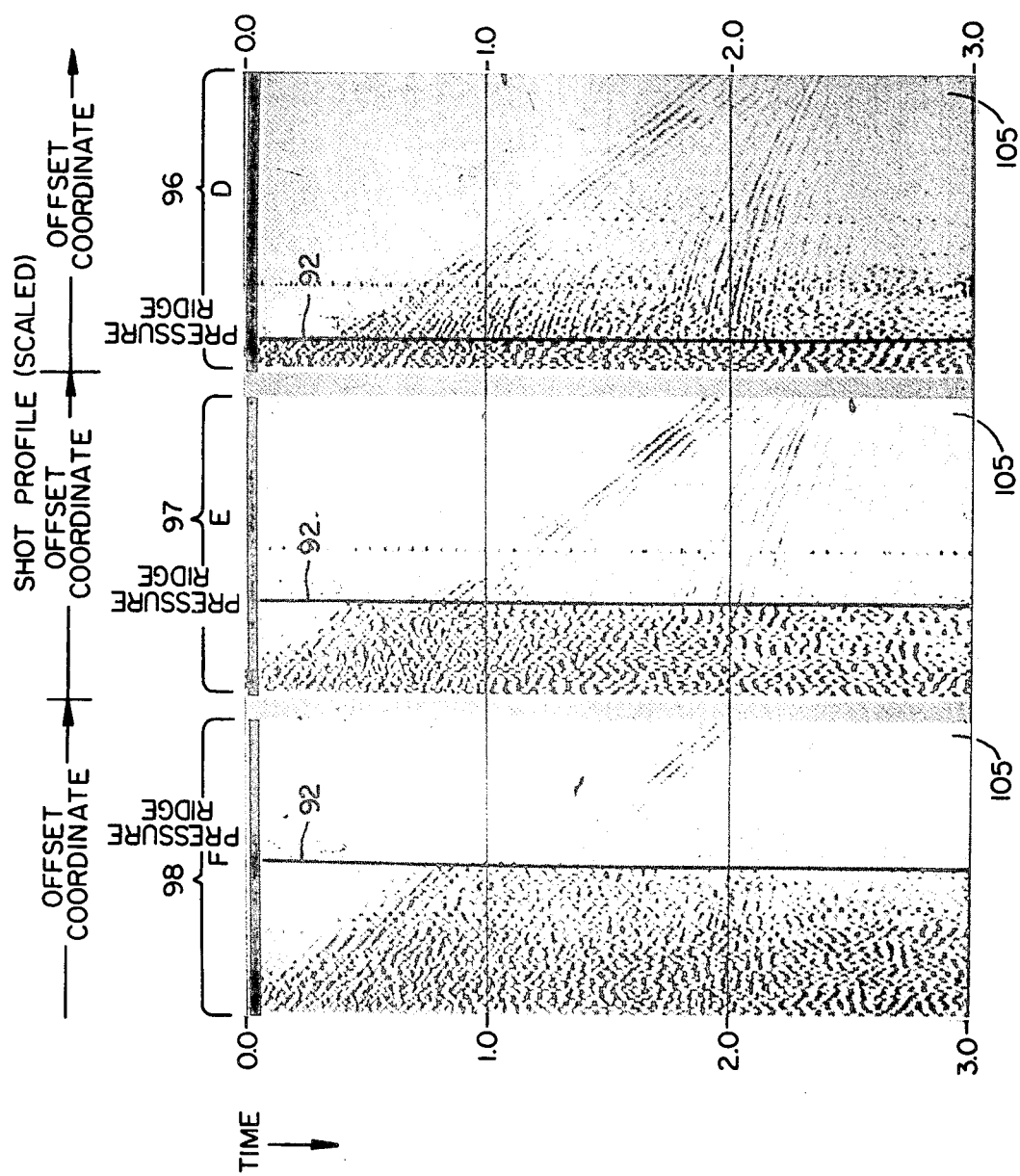
Figure 14:
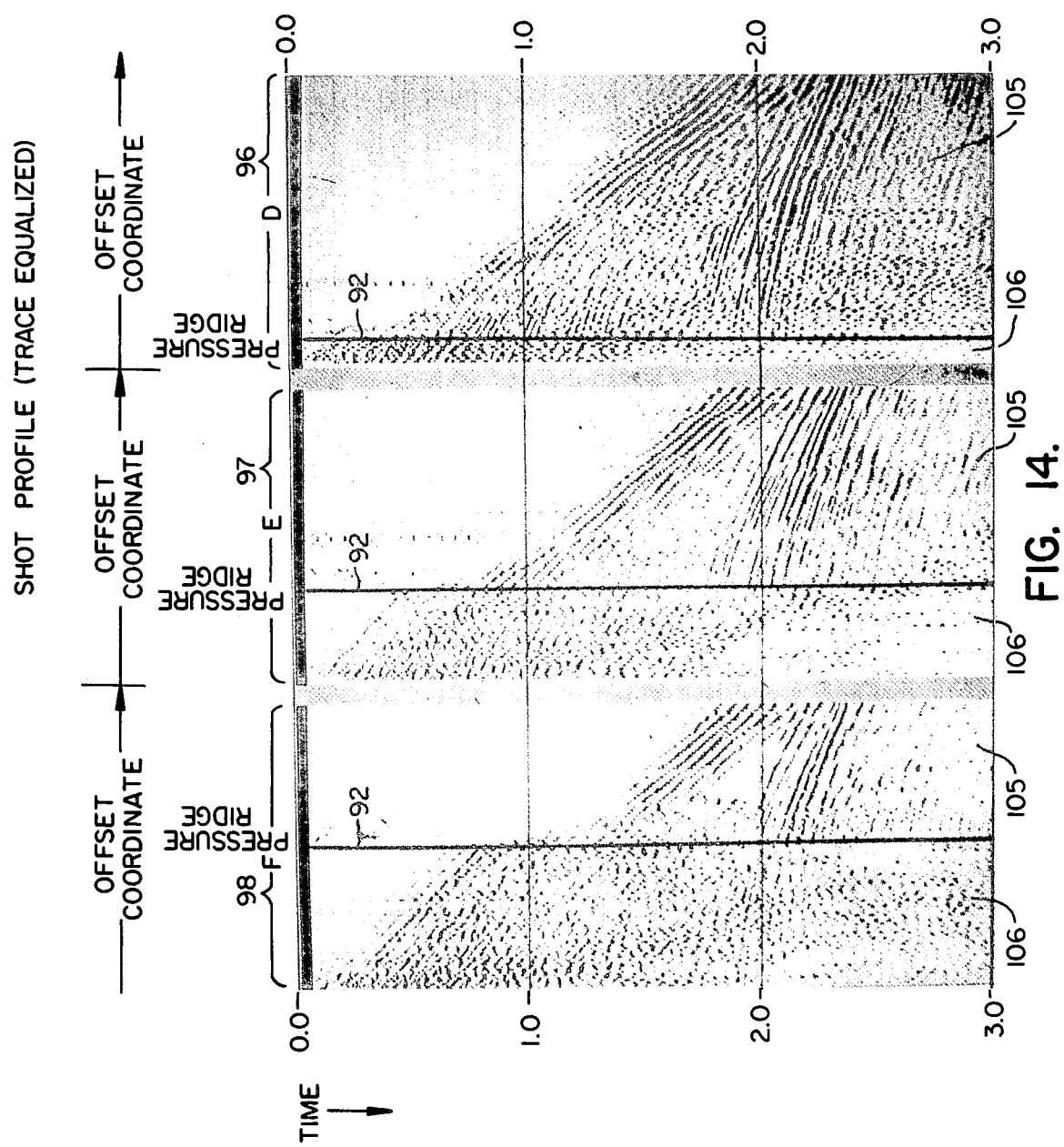

In this regard, note the displays for the profiles 96, 97 and 98 corresponding to data in the vicinity of lines "D", "E", "F" shown in FIGS. 13 and 14 (wherein certain of the geophones of the array were split by the ridge 92). There, the attenuation effects provided by the ridge 92 on the seismic collection process is profoundly and dramaticly in evidence. That is, the event definition of data collected by the far offset geophones of the split receiver array in the region 105 associated with the profiles 96, 97 and 98, respectively, is surprising. In this regard, note in FIG. 14 that the equalized traces at the far offset positions of the displays even more clearly illustrate the decoupling effect of the ridge 92 on the generated flexure waves, viz., over region 105, as compared with the region near offset 106, respectively. There, the traces are seen to possess superior event definition vis-a-vis the near traces to the left, as viewed, of the ridge 92, viz., in the regions 111, 112, and 113 previously mentioned.

In accordance with the present invention, the attenuation effects previously set forth to overcome the deleterious effects of flexure waves, can be used to surprising advantage if the collection system is designed so that pressure ridge or equivalent fracture zone is always positioned between the vibratory source and the array of receivers. That is, the line of survey or the vibratory source in field collection of data, must always be separated from that of the receiver array, by a pressure ridge or equivalent ice fracture zone in the near surface ice formation. Typical surface features that meet this standard includes of course pressure ridges and reconsolidated ice fracture zones as previously mentioned.

Figure 15:
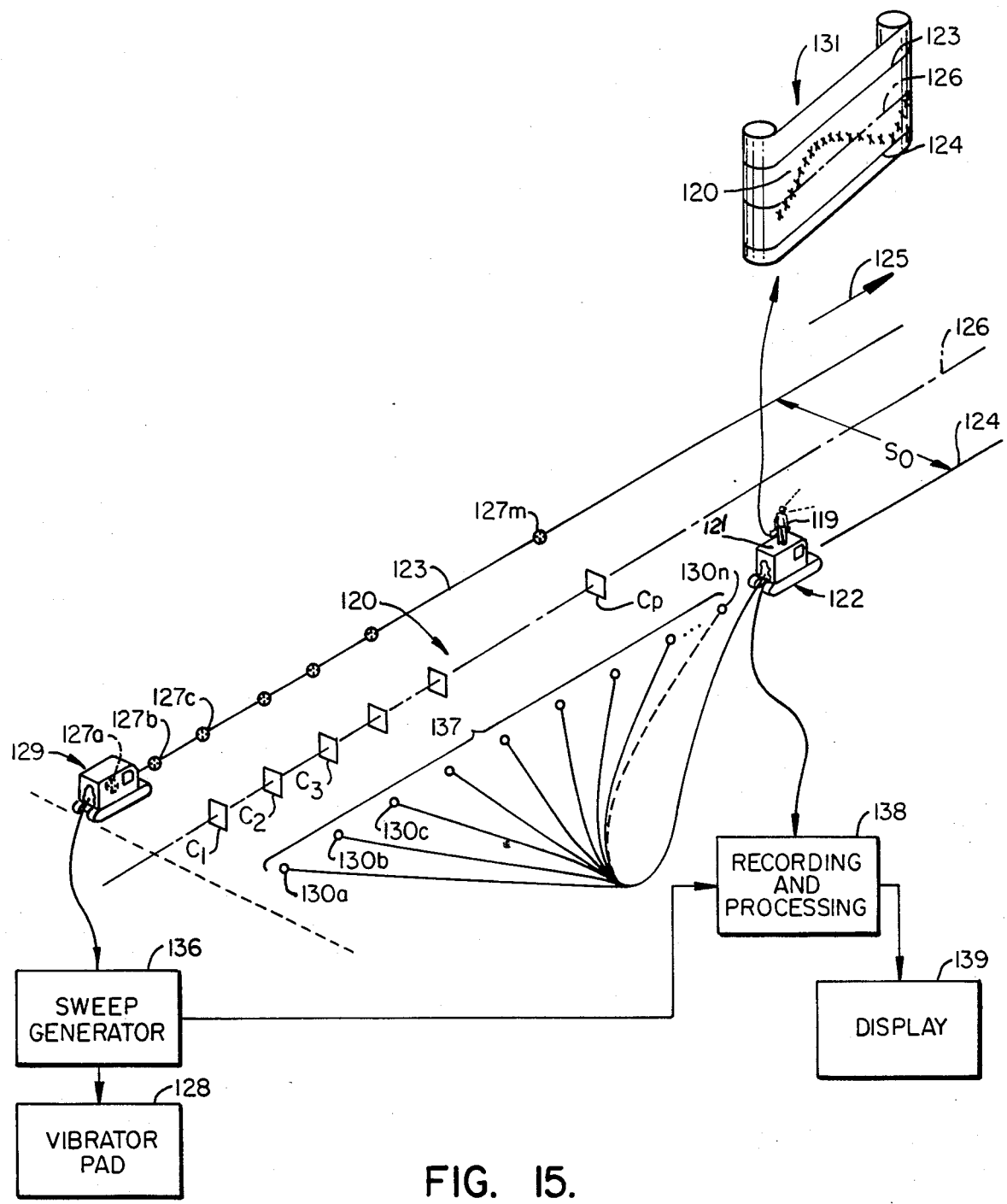
FIG. 15 illustrates a particular method of carrying out Vibroseis ®-type exploration in permafrost regions of the world in accordance with the teachings of the present invention.

In order to carry out the method of the invention in a permafrost zone of the world where generation of flexure waves by vibratory sources is of major concern, reference is now made to FIG. 15. Key to reducing flexure noise in accordance with the present invention: the crew chief 119 takes advantage of naturally occurring pressure ridges 120 in the manner indicated in FIG. 15 during all collection operations.

That is to say, as shown, the crew chief 119 of FIG. 15 can position himself on the roof 121 of his lead vehicle 122 and spot the locations of all pressure ridges 120 ahead of the vehicle 120 in the general area of the survey. Object: to map a series of discontinuous lines of travel 123 and 124 for the vibratory source/receiver array on a dynamic "catch-as-catch-can" has so that (although operations proceed in the general direction of arrow 125 along midpoint line of survey 126), nevertheless, pressure ridges 120 are always positioned between sourcepoints locations 127a, 127b . . . 127m, (where the source pad 128 attached to source vehicle 129 is to be sequentially activated), and the receiver positions 130a, 130b . . . 130n (where the data is to be collected).

In order that the mapping procedure involving ridges 120 systematically occur, preferably the chief 119 charts all ridges 120 in the general region of the survey in conventional fashion, say on a roll chart as a function of field coordinates associated with the line of survey 126. Such chart is indicated at 131 in FIG. 15. Next, coordinates for the series of lines of travel 123 and 124 vis-a-vis the line of survey 126 and pressure ridges 120, are also carried on chart 131. Then after the coordinates of the lines 123, 124, have been translated to field coordinates, survey operations commence.

Note in this regard that even though the line of midpoints C1, C2 . . . Cp are shown in FIG. 15 as being colinear with the line of survey 126, such is not always the case since the straddle distance So (between lines of travel 123 and 124 of the vibrator and receiver points, respectively), is a function of the width of the pressure ridges 120 and thus may vary from point-to-point along the line of survey 126. However, such restriction is relatively unimportant since regional rather than local structure is of importance in such permafrost regions where the method of the invention is to be employed.

In operations, after the lines of travel 123, 124, have been established, the source vehicle 129 with vibratory pad 128 is positioned at one of the series of sourcepoints 127a, 127b . . . 127m, and activated under control of sweep generator 136. Thereafter, data is received at geophone array 137, then processed including cross-correlation, and recorded and displayed using conventional processing, recording and display equipment within the lead vehicle 122, indicated at 138 and 139. Owing to the fact that flexure waves generated by the vibratory source are decoupled by the ridges 120, the resulting record has surprisingly superior event definitions than previously possible.

The invention is not limited to the above combinations alone, but is applicable to other anomalous circumstances as known to those skilled in the art. It should thus be understood that the invention is not limited to any specific embodiments set forth herein as variations are readily apparent to such persons and thus the invention is to be given the broadest possible interpretation within the terms of the following claims.

What is claimed is:

1. Method of improving resolution of seismic data collected in a transition zone of a permafrost region between a frozen land mass and an adjacent sea-ice region, said data being collected by common midpoint (CMP) collection methods including sequentially activating at least one conventional vibratory source at a series of sourcepoint locations across the surface of said permafrost region in which amplitude and phase spectra of the generated energy are controlled so that said generated energy changes smoothly as a function of time, and redundantly collection reflections thereof via a series of receivers at a plurality of receiver stations to provide 2-dimensional multifold coverage of the subsurface along a survey line, comprising the steps of:
   (a) adopting a survey strategy wherein said sourcepoint locations established for said at least one vibratory source, are always separated from said receiver stations by one or more ice fracture areas formed on or about the surface of the transition zone along said survey line;
   (b) generating seismic field records by positioning and employing said at least one vibratory source and said series of receivers in accordance with the collection strategy of step (a) such that individual sourcepoint-receiver station locations can be redundantly associated with a selected number of traces to form a series of CMP gathers associated with said survey line but wherein generated flexure vibrations associated with activation of said at least one vibratory source has been surprisingly attenuated by passage through said one or more ice fracture area whereby resolution of seismic reflection events associated with and depicted in said each trace, is much improved.

2. Method of claim 1 in which said improvement in event resolution in said each trace is brought about by, said flexure vibrations undergoing wave decoupling during passage through said one or more ice fracture areas.

3. Method of claim 2 in which said flexure vibrations are generated by said vibratory source at the same time as said seismic energy that changes smoothly with time, is generated.

4. Method of claims 1, 2 or 3 in which said one or more ice fracture areas is a ice pressure ridge formed of broken ice uplifted by pressure.

5. Method of claim 1 in which step (a) is further characterized by visually observing said one or more ice fracture areas from an observation truck on the surface of the transitions zone regions ahead of the array of receivers and said one vibratory source and redirecting the placement of sourcepoint and receiver station locations on a dynamic, "catch-to-catch-can" basis wherein said one or more ice fracture areas are always located between said one vibratory source and said series of receivers during data collection along said established line of survey.

6. Method of claim 1 in which step (b) is further characterized by having each shot profile provided during collection operations be associated with sourcepoint-receiver coordinates such that the sourcepoint location of any one such profile is physically separated from each associated receiver station location by said one or more pressure ridges.

7. Method of attenuating flexure vibrations during seismic surveying in a transition zone of a permafrost zone between a frozen land mass and an adjacent sea-ice region, where a vibrator as the energy source and an array of receivers as collectors of the reflected and refracted energy, are used in a common midpoint (CMP) collection mode to provide 2-dimensional multifold coverage of the subsurface along a survey line, said vibratory generating in addition to said flexure noise, seismic energy in which amplitude and phase spectra are controlled so that energy output changes smoothly with time, comprising the steps of:

(a) adopting a survey strategy wherein said sourcepoints established for the vibratory source is always separated from the receivers locations by one or more pressure ridges formed on or about the transition zone under survey along said survey line, and (b) carrying out seismic exploration wherein the strategy of step (a) is followed in the field over said transition zone wherein a series of gathers of 2-dimensional traces can be each associated with a common centerpoint located along said survey line between a series of different sourcepoint-receiver locations whereby said flexure vibrations are surprisingly attenuated prior to detection by said receivers, due to passage through said one or more pressure ridges.

8. Method of claim 7 in which said improvement in event resolution in said each trace is brought about by, said flexure vibrations undergoing wave decoupling during passage through said one or more pressure ridges.

9. Method of claim 8 in which said flexure vibrations are generated by said vibratory source at the same time as said seismic energy that changes smoothly with time, is generated.

10. Method of claim 7 in which step (b) is further characterized by having each shot profile of traces provided during collection operations be associated with sourcepoint-receiver coordinates such that the common sourcepoint location for each such profile is situated on one side of said one or more pressure ridges while each associated receiver station location is located on the other side of said one or more pressure ridges.

* * * * *